United States Patent
Brekelbaum et al.

(10) Patent No.: US 7,313,676 B2
(45) Date of Patent: Dec. 25, 2007

(54) REGISTER RENAMING FOR DYNAMIC MULTI-THREADING

(75) Inventors: Edward A. Brekelbaum, Austin, TX (US); Jeffrey P. Rupley, II, Round Rock, TX (US)

(73) Assignee: Intel Corporation, Santa Clara, CA (US)

( * ) Notice: Subject to any disclaimer, the term of this patent is extended or adjusted under 35 U.S.C. 154(b) by 199 days.

(21) Appl. No.: 10/184,250

(22) Filed: Jun. 26, 2002

(65) Prior Publication Data

US 2004/0006683 A1  Jan. 8, 2004

(51) Int. Cl.
*G06F 9/30* (2006.01)
(52) U.S. Cl. ...................................... 712/217
(58) Field of Classification Search ........... 712/217, 712/228, 235, 236
See application file for complete search history.

(56) References Cited

U.S. PATENT DOCUMENTS

| | | | | |
|---|---|---|---|---|
| 5,860,017 A | * | 1/1999 | Sharangpani et al. | 712/23 |
| 5,872,985 A | * | 2/1999 | Kimura | 710/1 |
| 5,996,068 A | * | 11/1999 | Dwyer et al. | 712/228 |
| 6,092,175 A | * | 7/2000 | Levy et al. | 712/23 |
| 6,330,661 B1 | * | 12/2001 | Torii | 712/228 |
| 6,687,812 B1 | * | 2/2004 | Shimada | 712/230 |

OTHER PUBLICATIONS

Y. Chou, J. Fung, and J. Shen, "Reducing Branch Misprediction Penalites via Dynamic Control and Independence Detection," Int'l Conference on Super-computing, Jun. 1999, 19 pages.

A. Klauser, A. Paithankar, and D. Grunwald, "Selective Eager Execution on the Polypath Architecture," 25th Int'l Symposium on Computer Architecture, Jun. 1998, 10 pages.

* cited by examiner

*Primary Examiner*—Eddie Chan
*Assistant Examiner*—Aimee J Li
(74) *Attorney, Agent, or Firm*—David P. McAbee

(57) ABSTRACT

A register renaming technique for dynamic multithreading. One disclosed embodiment includes a register map to store up to M×N values to map M registers for N threads. A set of N values, one per thread, and a set of state bits is associated with each of the M registers. Each set of state bits indicates which of the N values per register are valid and whether ones of the N sets of values have been written by a dynamic execution thread. In response to termination of a dynamic execution thread, recovery logic may update state bits associated with ones of the M registers that were written to during dynamic execution.

30 Claims, 4 Drawing Sheets

REGISTER RENAMING FOR DYNAMIC MULTI-THREADING

BACKGROUND

1. Field

The present disclosure pertains to register renaming techniques.

2. Description of Related Art

Computer programs often make extensive use of registers in performing desired operations. Managing registers efficiently is one great challenge for an instruction processor. Techniques which allow more efficient management of register resources may be beneficial to overall processing efficiency and therefore quite desirable.

Register renaming is one technique that allows greater throughput with a relatively limited register set. In a processor performing register renaming, multiple copies of a single register may be active at different states of commitment and/or speculation at a single time. As instructions retire, the committed state of the registers are updated in some form of register map which keeps track of the renamed registers.

In one prior art register renaming technique, a pool of registers with a free list is maintained. When a new register is needed, it is allocated from the free list, and a pointer to the register is tracked appropriately. In a multithreading microprocessor, the different threads typically each maintain their own pointers to the accurate register values. However, each pointer for a register points to an accurate value with respect to a different thread. Pointers are thread specific and a pointer associated with one thread should not point to an accurate value intended to be used by a different thread. For example, see Prior Art Table 1. In this prior art technique physical pointer 0 for each register corresponds to a first thread, and physical pointer 1 for each register corresponds to a second thread.

PRIOR ART TABLE 1

| Architected Register | Physical Pointer - Thread 0 | Physical Pointer - Thread 1 |
|---|---|---|
| R0 | P4 | P12 |
| R1 | P2 | P35 |
| ... | ... | ... |
| R7 | P247 | P20 |

Eager execution is a known technique which attempts to hide branch prediction latencies by executing both paths of a branch in separate threads. Eager execution complicates register renaming because another copy of the processor state is needed when a branch forks. Prior art approaches suggest copying over and maintaining a new set of registers dedicated to the forked thread that executes the second path. Then, when the branch is finally resolved, the extra registers (or their map values) may be copied over to establish the correct machine state. Such an approach may be costly due to the hardware and/or time necessary to allocate and track extra registers, as well as the hardware and/or time necessary to copy the extra registers back into a non-speculative map.

BRIEF DESCRIPTION OF THE FIGURES

The present invention is illustrated by way of example and not limitation in the Figures of the accompanying drawings.

DETAILED DESCRIPTION

The following description provides register renaming techniques for dynamic multithreading. In the following description, numerous specific details are set forth in order to provide a more thorough understanding of the present invention. It will be appreciated, however, by one skilled in the art that the invention may be practiced without such specific details. In other instances, control structures and gate level circuits have not been shown in detail in order not to obscure the invention. Those of ordinary skill in the art, with the included descriptions, will be able to implement appropriate logic circuits without undue experimentation.

Various embodiments disclosed may allow efficient register renaming in a multithreaded processor capable of some type of dynamic execution wherein the processor itself forks a single parent thread into two threads. The additional thread or threads may be forked under different conditions. One example of dynamic multithreading is eager execution, in which a processor forks off a new thread when a hard-to-predict branch is reached. By executing both sides of a hard-to-predict branch, the processor ensures that at least some processor resources are making useful forward progress on the correct branch path. The additional forked thread in some cases is not scheduled by the software or an operating system, but rather may be initiated by the processor itself upon detecting some particular condition. Other examples of dynamic multithreading including forking a prefetch thread, forking branch resolution threads, doing some speculative pre-computation in an additional thread, etc. Advantageously, some disclosed embodiments may reduce thread forking latency and/or allow the use of simpler, smaller, and/or cheaper thread forking logic versus the prior art approach of maintaining an additional set of registers and/or register maps to handle dynamic multithreading.

Figure 1:
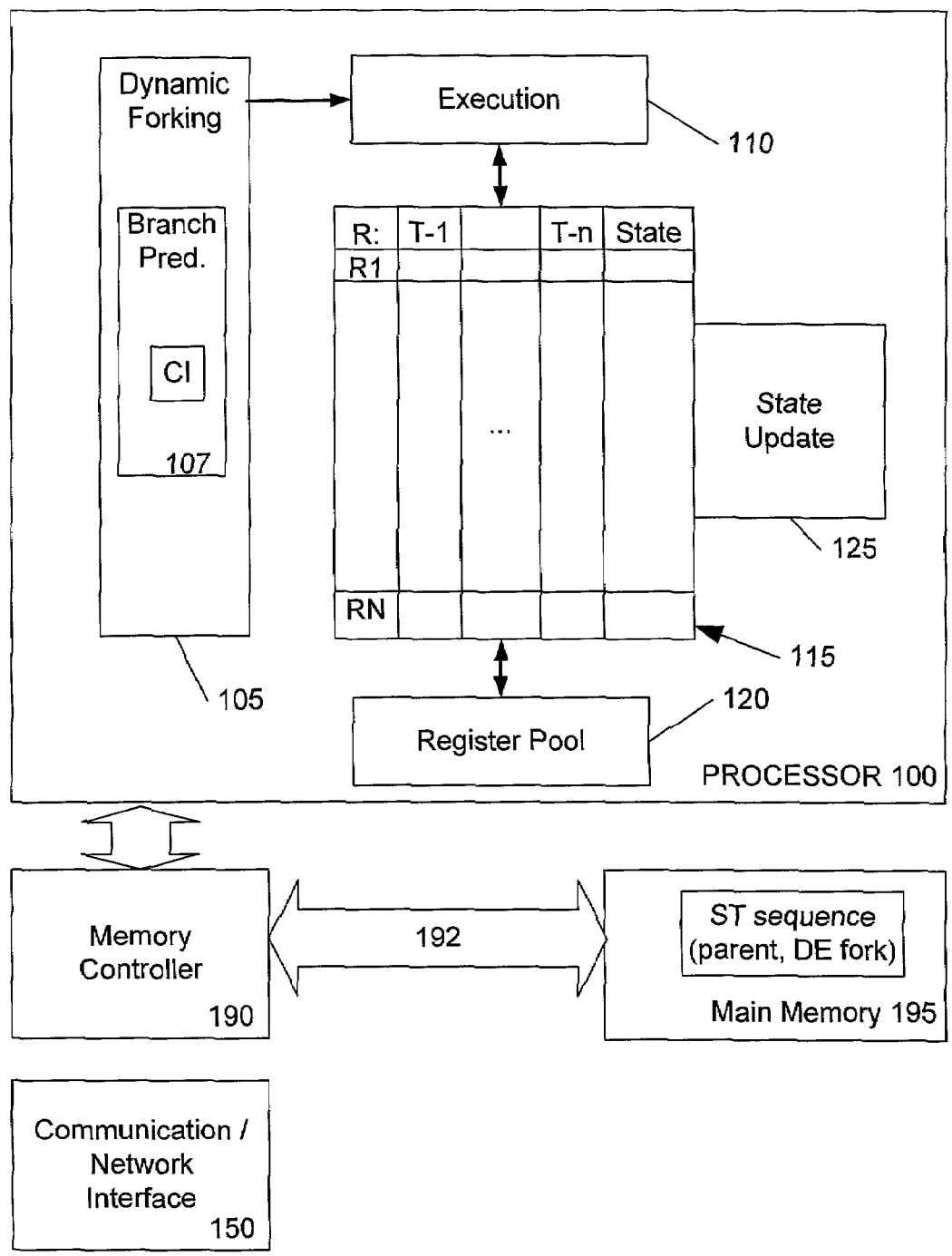
FIG. 1 illustrates one embodiment of a system utilizing a register renaming technique to support dynamic multi-threaded execution.

FIG. 1 illustrates one embodiment of a system utilizing a register renaming technique to support dynamic multi-threaded execution. In the embodiment of FIG. 1, a processor 100 includes dynamic forking logic 105 to dynamically fork a dynamic execution thread from a parent thread. As mentioned above, a variety of conditions could be used to select when to fork a dynamic execution thread.

The embodiment of FIG. 1 also includes a memory controller 190 which is coupled to the processor 100, and a main memory 195 which is coupled to the memory controller 190 by a bus 192. A communication and/or network interface 150 is also provided in this embodiment. The interface 150 is operatively coupled to be controlled by the processor. A variety of system configurations may be used, and the exact configuration is not particularly important to the disclosed techniques. The main memory 195 stores code sequences for execution by the processor. A single threaded program may be forked into multiple threads (parent fork, Dynamic Execution (DE) fork) by the dynamic forking logic 105 when the processor is not utilizing all its thread capacity (e.g., when less than the full number of threads is active or in a single-threaded mode).

In one embodiment, a branch predictor 107 may cause the second thread to be forked. In some embodiments, every branch may be forked into two threads. Such an approach may be costly because both sides of each branch may be executed. Another alternative is to only fork certain types of branches or to have hints as to when to fork branches. Another alternative is to utilize a confidence indicator (CI) as shown in FIG. 1. When the confidence indicator (CI) indicates low confidence in a branch prediction being performed by the branch predictor 107 (e.g., a difficult-to-predict branch), then the branch predictor 107 may fork the extra thread. A threshold may be selected based on various system considerations, and a programmable threshold or a shifting threshold based on overall processor utilization may be used in some embodiments.

In any case, under some conditions a second thread is generated from a parent thread. Execution logic 110 executes instructions from both threads. Of course, the execution logic 110 needs registers to perform certain operations. Therefore, a register map 115 and a register pool 120 are provided in this embodiment. The register map 115 provides a mapping between a physical register used to store a data item and architectural registers (i.e., actual and/or speculative machine state). Any of a variety of known or otherwise available register mapping techniques may be used, including the use of arrays instead of a register pool. As illustrated, the register map 115 tracks state for a set of registers, R1-RN in this embodiment. Each register has an entry for each thread. Each entry therefore provides a thread specific register map value that indicates, for that thread, which physical register from the register pool 120 corresponds to the architectural register indicated.

According to disclosed techniques, the register map 115 also includes a set of state bits. The state bits are maintained by state update logic 125. Each time a register is written to, the state update logic 125 updates the state bits. The term "update", as used herein refers to updating if necessary. "Update" does not necessarily mean an alteration occurs each time because many times a set of state bits may be in a state which would remain the correct state even after a register write. Therefore, an update only sometimes changes the state bit value, doing so if the register write necessitates such a change according to the source of the write, the internal state bits, and the definitions of the states defined by the state bits.

The state bits allow the register map 115 to keep track of which thread wrote a correct value. In dynamic execution, one thread may turn out to be incorrect, and therefore its results must be eliminated from the processor state. Therefore, it may be important to know which registers were written to by an incorrect thread and which registers were written to by the correct thread so that values from the incorrect thread may be disregarded. Thus, the state bits track which thread has written to each register during dynamic execution.

Eventually, the "correct" thread is ascertained. For example, in embodiments where a branch predictor forks the dynamic execution thread, when the branch is resolved, the correct thread is known. When the correct thread is known, the state update logic 125 updates the state bits to recover the correct state. The state update logic 125 reconciles the state bits to indicate which thread specific register map entry holds the presently accurate value for that particular registers. Reconciliation of a few state bits may be more efficient than flash copy techniques proposed in the prior art, in which multiple register map values need to be copied over.

Figure 2:
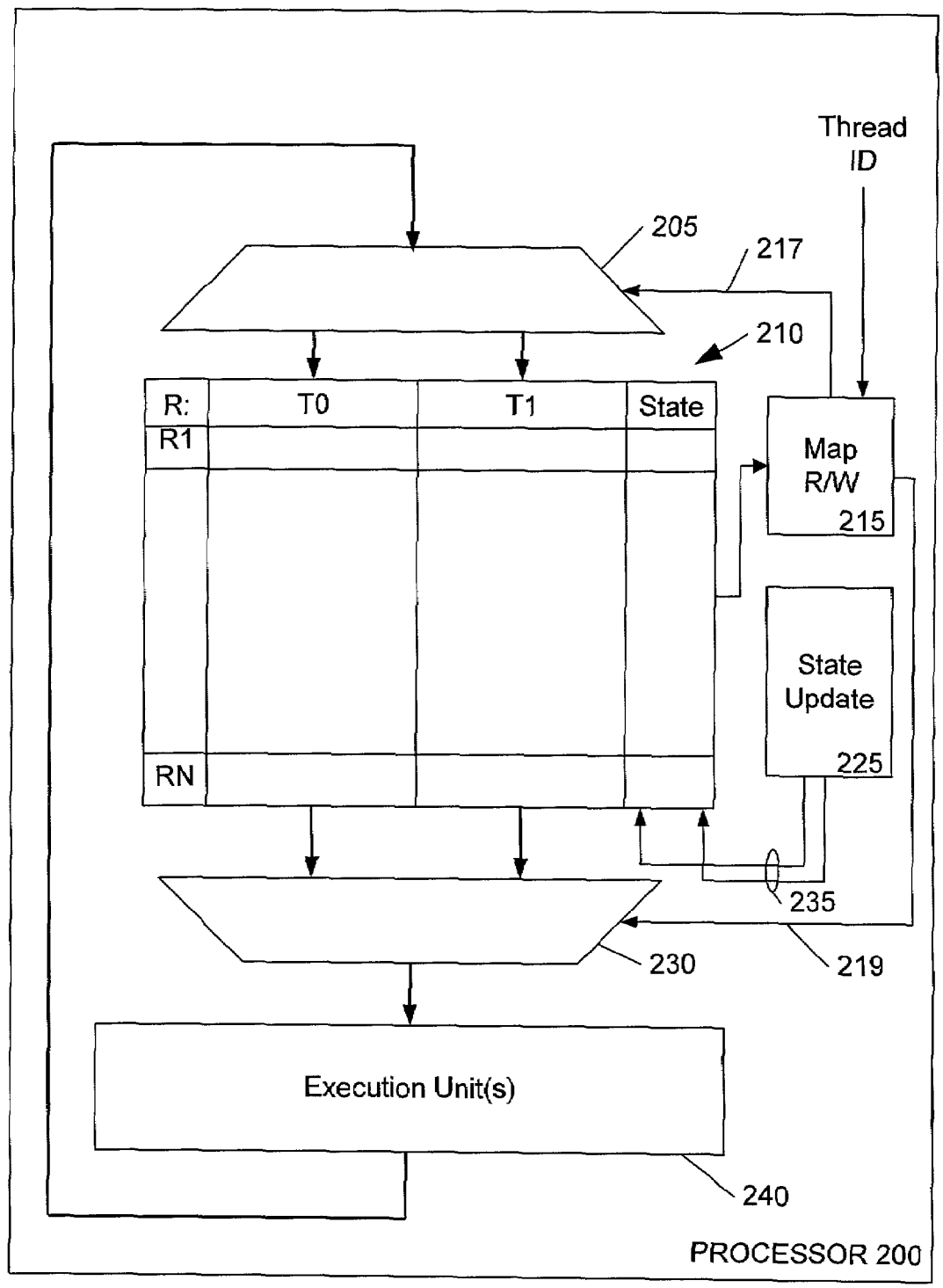
FIG. 2 illustrates one embodiment of a processor having register renaming logic supportive of dynamic multi-threaded execution for two threads.

FIG. 2 illustrates an embodiment of a processor 200 having register renaming logic supportive of dynamic multithreaded execution for two threads. In the embodiment of FIG. 2, the processor includes a register map 210 and state update logic 225 to keep track of the state of the register map values of the register map 210. In the embodiment of FIG. 2, the register map 210 tracks state for registers R1 through RN for two threads, thread T0 and thread T1. In the embodiment of FIG. 2, two state reset signals 235 are shown coupled to the state bits. In one embodiment, the states may be encoded such that state may be updated as a part of reconciliation by activating one of the two state reset signals 235.

Additionally, the state bits are provided to map read and write logic 215 which drives control lines 217 and 219 to control an input multiplexer 205 and an output multiplexer 230. The input multiplexer couples the register map 210 to execution unit(s) 240, and the output multiplexer 230 couples the register map 210 to the execution unit(s) 240. The map read and write logic 215 determines which register map value to read or write from based on the state bits and the thread ID of the executing thread performing the read or the write.

Figure 3:
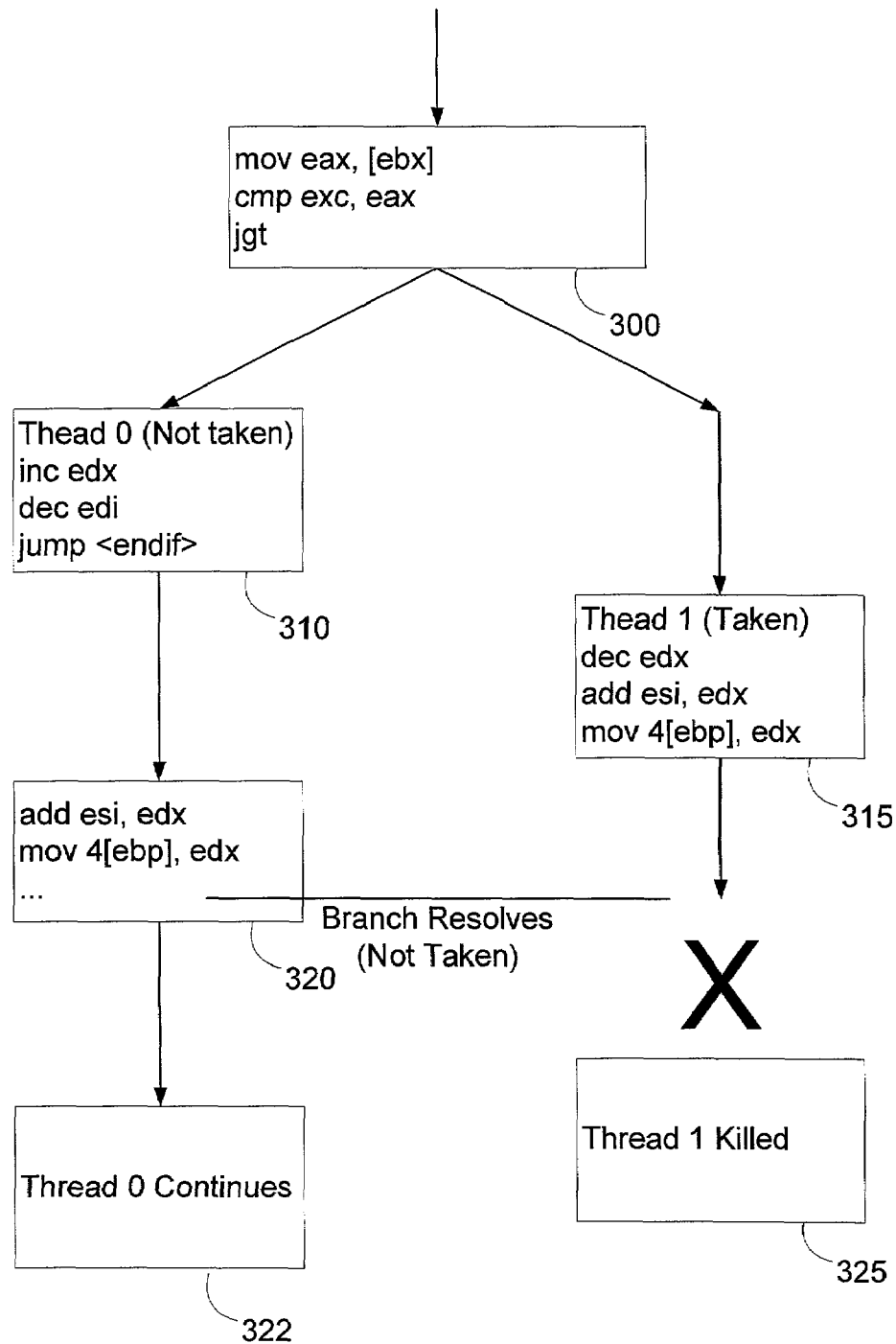
FIG. 3 illustrates a code sequence example for one embodiment.

FIG. 3 illustrates a code sequence example to help illustrate operation of the embodiment of FIG. 2. In this example, the states stored by the state bits are represented as states A-D according to Table 1. One of skill in the art will recognize that various bit encodings could be used to represent these states, but in some cases as few as two bits may be used. Also, in this embodiment, two threads of an eagerly executed branch are enumerated as thread 0 (not-taken path) and thread1 (taken path). In one embodiment, the registers R1 through RN are registers from an x86 or Intel Architecture compatible processor, but in other embodiments, the registers may be any set of registers from a variety of different types of processors with multithreading capabilities.

TABLE 1

| State Name | State Descriptions Meaning |
|---|---|
| A | Only pointer0 is valid |
| B | Only pointer1 is valid |
| C | Thread0 uses pointer0; Thread1 uses pointer1 |
| D | Thread0 uses pointer1; Thread1 uses pointer0 |

Table 2 illustrates a code sequence with a branch (jgt) that is not well predicted, and where the instruction stream is forked at the jgt branch. In this case, the processor then alternates instruction supply from the two threads. In this example, it is assumed that three instructions are executed at a time for each thread. Therefore, three instructions are executed from one thread and then a switch occurs, etc. The two paths of the branch (not-taken and taken) have arbitrarily been assigned as thread0 and thread1 in this example. Eventually the branch will resolve and one of threads will be killed.

TABLE 2

Example Code Sequence

|  |  |
|---|---|
|  | mov eax, [ebx] |
|  | cmp ecx, eax |
|  | jgt <else> |
|  | inc edx |
|  | dec edi |
|  | jump <endif> |
| else: | dec edx |
| endif: | add esi, edx |
|  | mov 4[ebp], edx |

The initial state used in this example is given in Table 3. Note that valid physical renames can be in either pointer. This is because prior dynamic multithreading may have left the correct registers in either pointer.

TABLE 3

Initial State

| Architected Register | State | Pointer 0 | Pointer 1 |
|---|---|---|---|
| eax | A | P0 |  |
| ebx | A | P1 |  |
| ecx | B |  | P2 |
| edx | A | P3 |  |
| esi | A | P4 |  |
| edi | A | P5 |  |
| ebp | A | P6 |  |
| esp | B |  | P7 |
| flags | A | P8 |  |

As indicated in block 300 of FIG. 3, the first cycle of renaming covers the mov, cmp, and jgt instructions. The mov reads ebx (P1) and writes eax, which updates it to P9 (in general, physical renames are not necessarily returned from a free list of registers in the register pool as ordered, but we assume this occurs in this example for simplicity). The cmp reads ecx (P2) and eax (P9 from bypass of mov target) and writes the flags as P10. The jgt reads the flags (P10 from bypass of cmp target). When only one thread is active, no states are updated according to one embodiment. After forking, when two threads are active, state update in this example is performed according to Table 4.

TABLE 4

State Update When Forked

| Current State | New State | |
|---|---|---|
|  | Thread1 write | Thread0 write |
| A | C | D |
| B | D | C |
| C | C | C |
| D | D | D |

The next state after the state updates performed in conjunction with the instructions dispatched in block 300 is shown below in Table 5.

TABLE 5

State after Block 300

| Architected Register | State | Pointer 0 | Pointer 1 |
|---|---|---|---|
| eax | A | P9 |  |
| ebx | A | P1 |  |
| ecx | B |  | P2 |
| edx | A | P3 |  |
| esi | A | P4 |  |
| edi | A | P5 |  |
| ebp | A | P6 |  |
| esp | B |  | P7 |
| flags | A | P10 |  |

Next, in this example, the threads fork to blocks 310 and 315. In this example, the fall-though path of thread 0 is processed first. Thus, in block 310, the inc, dec, and jump instructions are processed. The inc reads edx (P3) and also writes edx. Since edx is state A, we write P11 to Pointer1 and update to state D. The dec reads edi (P5), and writes P12 to Pointer1 and updates to state D. The next state after block 310 is shown below in Table 6.

TABLE 6

State after Block 310

| Architected Register | State | Pointer 0 | Pointer 1 |
|---|---|---|---|
| eax | A | P9 |  |
| ebx | A | P1 |  |
| ecx | B |  | P2 |
| edx | D | P3 | P11 |
| esi | A | P4 |  |
| edi | D | P5 | P12 |
| ebp | A | P6 |  |
| esp | B |  | P7 |
| flags | A | P10 |  |

The next set of instructions is from the taken path (designated here as thread1) which initially consists of the dec, add, and mov instructions as indicated in block 315. The dec reads edx, which for thread1 and state D is P3, and updates edx in Pointer0 with P13. The add reads esi (P4) and edx (P13 from the dec bypass), and updates esi. Since esi is in state A, we write P14 to Pointer1 and update to state C. The mov instruction reads ebp (P6) and edx (P13 from the dec bypass), but does not have a target so does not perform an update. The next state after block 315 is shown below in Table 7.

TABLE 7

State after Block 315

| Architected Register | State | Pointer 0 | Pointer 1 |
|---|---|---|---|
| eax | A | P9 |  |
| ebx | A | P1 |  |
| ecx | B |  | P2 |
| edx | D | P13 | P11 |
| esi | C | P4 | P14 |
| edi | D | P5 | P12 |
| ebp | A | P6 |  |
| esp | B |  | P7 |
| flags | A | P10 |  |

The next set of instructions executed is shown in block 320. This group is part of the fall-through path (thread0), and consists of the add and mov as indicated in block 320. The add reads esi (P4 for thread0 in state C), and edx (P11 in Pointer1 for thread0 in state D), and writes esi as P15 (Pointer0 for thread0 in state C). The mov reads ebp (P6) and edx (P11), and does not update a register target. The next state after block 320 is shown below in Table 8.

TABLE 8

State after Block 320

| Architected Register | State | Pointer 0 | Pointer 1 |
|---|---|---|---|
| Eax | A | P9 | |
| Ebx | A | P1 | |
| Ecx | B | | P2 |
| Edx | D | P13 | P11 |
| Esi | C | P15 | P14 |
| Edi | D | P5 | P12 |
| Ebp | A | P6 | |
| Esp | B | | P7 |
| Flags | A | P10 | |

In some embodiments, a system would continue executing further ahead at this point, but for simplicity this example assumes a branch resolution and recovery of the rename table. State reconciliation in this example is performed according to Table 9.

TABLE 9

State Reconciliation

| | New State | |
|---|---|---|
| Current State | Thead1 is correct | Thread0 is correct |
| A | A | A |
| B | B | B |
| C | B | A |
| D | A | B |

If the branch is resolved as not-taken, then thread0 results are valid and thread0 continues as indicated in block 320, whereas thread1 is killed as indicated in block 325 and its results discarded. Additionally, all state D entries in the register map are updated to State B and all state C entries are updated to state A as per Table 9. The next state for the branch being resolved as not-taken is shown below in Table 10. If the branch had been resolved as taken, then the state updates would have been D to A and C to B.

TABLE 10

State after Reconciliation

| Architected Register | State | Pointer 0 | Pointer 1 |
|---|---|---|---|
| Eax | A | P9 | |
| Ebx | A | P1 | |
| Ecx | B | | P2 |
| Edx | B | P13 (Don't Care) | P11 |
| Esi | A | P15 | P14 (Don't Care) |
| Edi | B | P5 (Don't Care) | P12 |
| Ebp | A | P6 | |
| Esp | B | | P7 |
| Flags | A | P10 | |

Thus, after reconciliation, all registers indicate either state A or state B. Therefore, either pointer 0 or pointer 1 is accurate. When executing, the processor reads from and/or writes to registers considering the state as per map read and write logic 215 which takes the state and the executing thread as inputs. Subsequent threads, whether forked or not, can execute properly without having to flash copy register map values (pointers) over to new locations. Rather, the pointers are left where they are and the state bits used to select the proper pointers when reading and writing the registers.

Figure 4:
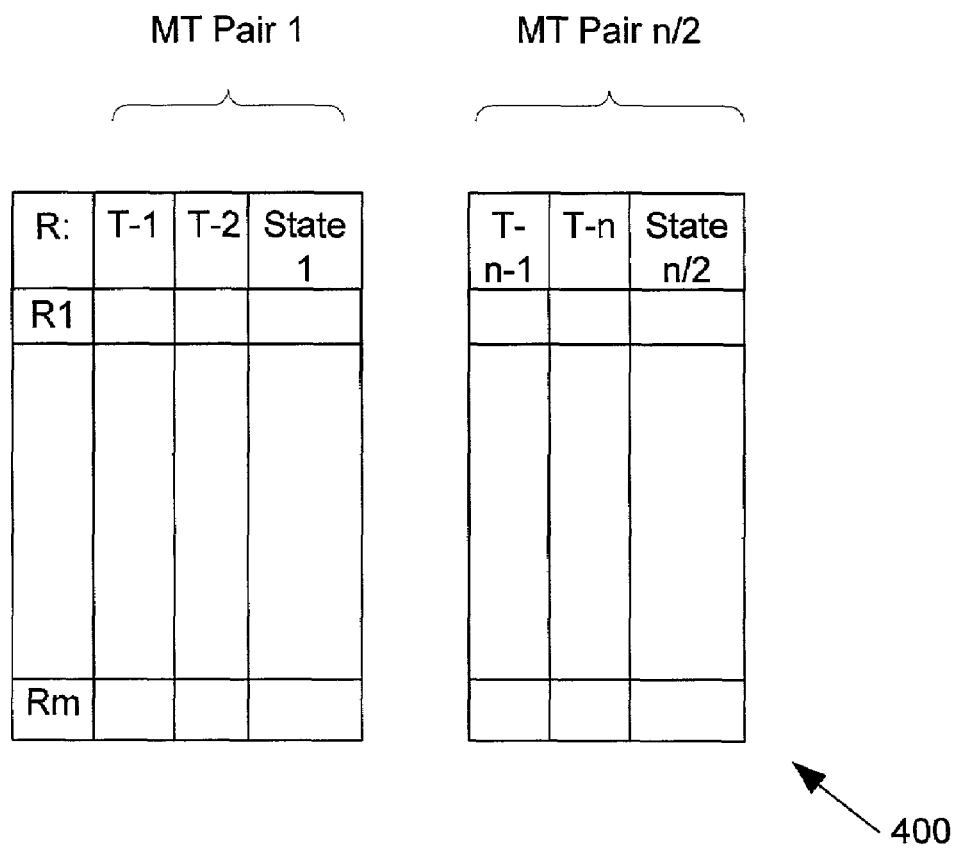
FIG. 4 illustrates one embodiment allowing dynamic multithreaded execution for a number of pairs of thread resources.

FIG. 4 expands on the embodiment of FIG. 3 by allowing multiple pairs of threads to perform eager execution or another dynamic multithreading process. In the embodiment of FIG. 4, a register map 400 is grouped by pairs of threads. Each pair of register mappings has its own state bits. For example, a first multithreading pair (MT Pair 1) can store mapping values for thread 1 and thread 2 and has a set of state bits (state 1). Another pair, MT pair N/2 can store mapping values for thread N and thread N-1. Such an arrangement allows the use of a similar state mapping technique for each pair of threads and also limits the complexity of the mapping and update logic by keeping the number of bits needed to represent the correct mapping possibilities down to a limited number. For example, the techniques described with respect to FIGS. 2 and 3 may be used for each pair of threads in some embodiments.

In this type of paired arrangement, dynamic multithreading may be allowed when the second thread in the thread pair is available. If so, a new thread may be forked and tracked by the second set of tracking resources in the pair. Thus, a fixed execution slot is available for dynamic multithreading in this embodiment.

A typical hardware design may go through various stages, from creation to simulation to fabrication. Data representing a design may represent the design in a number of manners. First, as is useful in simulations, the hardware may be represented using a hardware description language or another functional description language Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. In any representation of the design, the data may be stored in any form of a machine readable medium. In a software design, the design typically remains on a machine readable medium. An optical or electrical wave modulated or otherwise generated to transmit such information, a memory, or a magnetic or optical storage such as a disc may be the machine readable medium. Any of these mediums may "carry" the design information.

Thus, register renaming techniques for dynamic multithreading are disclosed. While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art upon studying this disclosure.

What is claimed is:

1. An apparatus comprising:
    a single integrated register map to store up to M×N values to map M registers for N threads, a set of N values being associated with each of the M registers, wherein M and N are positive integers;
    a plurality of M sets of state bits, each set of state bits being associated with one of said M registers and to indicate which of any of the set of N values of the register map are valid for the associated one of said M registers for each thread and whether ones of said N sets of values have been written to during execution of a speculative thread; and recovery logic to, responsive to termination of said speculative thread, update one or more of the sets of state bits to indicate one of a plurality of states, such that it is to alter said state bits indicative of a one of the states to indicate another of the states based on which of a first thread and a second thread is determined to be non-speculative.

2. The apparatus of claim 1, wherein said recovery logic is further to: responsive to a termination of said speculative thread, update said one or more sets of state bits that are associated with ones of said M registers written to during execution of said speculative thread.

3. The apparatus of claim 2 wherein valid ones of said M×N values are pointers to a plurality of physical registers in a register pool.

4. The apparatus of claim 3 wherein N equals 2.

5. The apparatus of claim 3 wherein said recovery logic is to alter said one or more sets of state bits that are associated with ones of said N pointers being used by said speculative thread to indicate which of said N pointers used by said speculative thread is valid.

6. The apparatus of claim 5 wherein N equals 2 and wherein each of said plurality of M sets of state bits comprises two state bits, wherein said two state bits indicate one of four states comprising:
a first state in which a first thread pointer for a first thread is valid;
a second state in which a second thread pointer for a second thread is valid;
a third state in which dynamic execution of a speculative thread is active;
a fourth state in which dynamic execution of the speculative thread is active.

7. The apparatus of claim 6 wherein said recovery logic is to alter any state bits indicative of said third state or said fourth state in response to the termination of the speculative thread.

8. The apparatus of claim 7 wherein said recovery logic is, in response to the termination of the speculative thread, to alter said state bits indicative of said third state to indicate said first state if said first thread is non-speculative, to alter said state bits indicative of said third state to indicate said second state if said second thread is non-speculative, to alter said state bits indicative of said fourth state to indicate said second state if said first thread is non-speculative, and to alter said state bits indicative of said fourth state to indicate said first state if said second thread is non-speculative.

9. The apparatus of claim 5 further comprising: branch prediction logic, wherein said termination of said speculative thread is caused by said branch prediction logic in response to resolution of a branch.

10. The apparatus of claim 9 wherein said branch prediction logic comprises: a confidence indicator, wherein said branch prediction logic is to fork said speculative thread in response to a low confidence branch prediction.

11. The apparatus of claim 1 further comprising: forking logic to commence said speculative thread from a parent thread in response to a branch instruction.

12. The apparatus of claim 2 further comprising branch prediction logic to select either a parent thread or a speculative thread as a correct thread and wherein said recovery logic is to alter the set of state bits associated with each register written to by either the dynamic execution thread or the parent thread during execution of the dynamic execution thread to indicate values associated with said correct thread are valid.

13. The apparatus of claim 4 further comprising: a plurality of other register maps, each of said plurality of other register maps to track register values for another speculative and parent thread pair.

14. The apparatus of claim 13 wherein each speculative and parent thread pair is limited to fixed execution slots with respect to each other.

15. The apparatus of claim 11 wherein said apparatus is a system further comprising:
a memory to store instructions for said parent thread and said speculative thread wherein said instructions for said parent thread and said speculative thread are a portion of a single threaded program;
a network interface to connect to other computers.

16. A method comprising:
executing a first path of a branch with a first thread and a second path of a branch with a second threat;
updating a thread specific register map value in an entry of a single register map, in response to a write from the first thread to a first register associated with the entry modifying a plurality of state bits associated with the entry in response to the write from the first thread;
reconciling said plurality of state bits to indicate the thread specific register map value is valid for the first register in response to terminating the second thread and determining the second path executed by the second thread is a not-taken path.

17. The method of claim 16 farther comprising: forking said second thread in response to an instruction in said first thread.

18. The method of claim 16, further comprising forking said second thread in response to the branch being a difficult-to-predict branch.

19. The method of claim 17 wherein the first thread is a parent thread and the second thread is a child thread.

20. The method of claim 16 wherein the plurality of state bits are capable of representing four states, and wherein updating a thread specific register map value comprises: setting said plurality of state bits to one of the four states.

21. An apparatus comprising:
branch prediction logic to fork a child thread from a parent thread in response to a branch instruction, wherein said branch prediction logic is also to determine whether the parent thread or the child thread corresponds to a taken path for the branch instruction;
a single register map to store two pointers for a register and a plurality of state bits for said register, said register map to update said plurality of state bits in response to a write from either said child thread or said parent thread during execution of both the parent and the child threads;
wherein said register map is further to perform a first set of state modifications for said plurality of state bits in response to the write, the set of state modifications based on whether the speculative thread or the parent thread performed the write; and
recovery logic to perform a second set of state modifications for said plurality of state bits in response to a determination of whether the child thread or the parent thread is a taken path and terminating the child thread if it is a non-taken path.

22. The apparatus of claim 21 wherein said branch prediction logic is only to fork said child thread if said branch instruction has a confidence indicator below a selected threshold.

23. The apparatus of claim 21 wherein said plurality of state bits represent four states, an A state, a B state, a C state, and a D state, wherein said first set of state modifications further comprises:
   update said state bits that represent said A state to represent said C state in response to a child thread write and to represent said D state in response to a parent thread write;
   update said state bits that represent said B state to represent said D state in response to a child thread write and to represent said C state in response to a parent thread write;
   update said state bits that represent said C state to represent said C state in response to a child thread write and to represent said C state in response to a parent thread write;
   update said state bits that represent said D state to represent said D state in response to a child thread write and to represent said D state in response to a parent thread write.

24. The apparatus of claim 23 wherein said second set of state modifications further comprises:
   update said state bits that represent said A state to represent said A state if said child thread corresponds to a taken path and to represent said A state if said parent thread corresponds to a taken path;
   update said state bits that represent said B state to represent said B state if said child thread corresponds to a taken path and to represent said B state if said parent thread corresponds to a taken path;
   update said state bits that represent said C state to represent said B state if said child thread corresponds to a taken path and to represent said A state if said parent thread corresponds to a taken path;
   update said state bits that represent said D state to represent said A state if said child thread corresponds to a taken path and to represent said B state if said parent thread corresponds to a taken path.

25. The apparatus of claim 21 further comprising a second register map for a second pair of threads, wherein said branch prediction logic may fork a second parent thread to generate a second child thread tracked by said second register map, wherein said second speculative thread is forked only if said second register map is available.

26. The apparatus of claim 21 wherein said apparatus is a system further comprising:
   a memory to store instructions for said parent thread and said child thread;
   a network interface to connect to other computers.

27. A register renaming apparatus comprising:
   means for storing an integrated register rename map for a plurality of threads, the plurality including a first thread and a dynamically generated second thread;
   means for storing one or more states for the first thread and the dynamically-generated second thread;
   means for updating the one or more states when one of said first thread and said dynamically generated second thread is killed based on which of the first thread and the dynamically generated second thread is determined to be non-speculative.

28. The register renaming apparatus of claim 27 further comprising:
   means for determining when to dynamically fork said second thread.

29. The register renaming apparatus of claim 28 wherein said means for determining when to dynamically fork said second thread further comprises:
   confidence means to fork said second thread when a low confidence prediction is made.

30. The register renaming apparatus of claim 29 wherein said means for updating one or more states is further to update said means for storing in response to a register write by either thread.

* * * * *